US010574790B2

(12) United States Patent
Biron, III

(10) Patent No.: US 10,574,790 B2
(45) Date of Patent: Feb. 25, 2020

(54) SCRIPTING WEB SERVICES

(71) Applicant: PTC Inc., Needham, MA (US)

(72) Inventor: Joseph L. Biron, III, North Dartmouth, MA (US)

(73) Assignee: PTC Inc., Needham, MA (US)

(*) Notice: Subject to any disclaimer, the term of this patent is extended or adjusted under 35 U.S.C. 154(b) by 195 days.

(21) Appl. No.: 15/649,758

(22) Filed: Jul. 14, 2017

(65) Prior Publication Data
US 2018/0007167 A1 Jan. 4, 2018

Related U.S. Application Data

(63) Continuation of application No. 14/921,182, filed on Oct. 23, 2015, now Pat. No. 9,712,644, which is a continuation of application No. 14/170,082, filed on Jan. 31, 2014, now Pat. No. 9,172,745, which is a continuation of application No. 12/952,890, filed on Nov. 23, 2010, now Pat. No. 8,689,181.

(51) Int. Cl.
G06F 9/44 (2018.01)
H04L 29/08 (2006.01)
G06F 9/455 (2018.01)
H04L 12/24 (2006.01)

(52) U.S. Cl.
CPC ........ H04L 67/327 (2013.01); G06F 9/45512 (2013.01); H04L 41/22 (2013.01); H04L 67/02 (2013.01); H04L 67/10 (2013.01); H04L 67/14 (2013.01)

(58) Field of Classification Search
CPC ....... H04L 67/327; H04L 41/22; H04L 67/02; H04L 67/10; H04L 67/14; G06F 9/45512

USPC .................................. 717/115, 717
See application file for complete search history.

(56) References Cited

U.S. PATENT DOCUMENTS

| | | | |
|---|---|---|---|
| 5,867,647 A | 2/1999 | Haigh et al. | |
| 6,154,751 A | 11/2000 | Ault et al. | |
| 6,631,512 B1 * | 10/2003 | Onyeabor | G06F 16/958 717/100 |
| 6,704,873 B1 * | 3/2004 | Underwood | H04L 63/02 709/223 |
| 6,816,880 B1 | 11/2004 | Strandberg et al. | |
| 6,968,539 B1 | 11/2005 | Huang et al. | |

(Continued)

FOREIGN PATENT DOCUMENTS

WO WO-2012/071037 A2 5/2012

OTHER PUBLICATIONS

Title: How BPEL and SOA are changing Web services development; author: J. Pasley resource: IEEE, dated 2005.*
(Continued)

Primary Examiner — Chameli Das
(74) Attorney, Agent, or Firm — Burns & Levinson LLP

(57) ABSTRACT

A process performed on a server includes configuring the server to enable script for a Web service to be defined dynamically, where the Web service includes an application program interface (API) for enabling access by, and interaction with, a computer program executing on a device other than the server. The process also includes compiling the script to produce machine-executable code for the Web service, receiving a call from the computer program to the Web service, executing the machine-executable code in response to the call to produce an output, and sending the output to the device.

21 Claims, 6 Drawing Sheets

(56) References Cited

U.S. PATENT DOCUMENTS

| | | | |
|---|---|---|---|
| 7,117,239 B1 | 10/2006 | Hansen | |
| 7,162,649 B1* | 1/2007 | Ide | G06F 21/31 |
| | | | 709/223 |
| 7,178,149 B2 | 2/2007 | Hansen | |
| 7,185,014 B1 | 2/2007 | Hansen | |
| 7,349,913 B2 | 3/2008 | Clark et al. | |
| 7,636,852 B1 | 12/2009 | Balasubramanian et al. | |
| 7,836,303 B2 | 11/2010 | Levy et al. | |
| 8,108,543 B2 | 1/2012 | Hansen | |
| 8,406,119 B2 | 3/2013 | Taylor et al. | |
| 8,689,181 B2 | 4/2014 | Biron, III | |
| 9,172,745 B2 | 10/2015 | Biron, III | |
| 9,438,625 B1* | 9/2016 | Yang | H04L 63/1441 |
| 9,712,644 B2 | 7/2017 | Biron, III | |
| 2002/0156870 A1 | 10/2002 | Boroumand et al. | |
| 2003/0023957 A1 | 1/2003 | Bau et al. | |
| 2003/0195968 A1* | 10/2003 | Selgas | H04L 29/06 |
| | | | 709/228 |
| 2005/0050054 A1 | 3/2005 | Clark et al. | |
| 2005/0050537 A1 | 3/2005 | Thompson et al. | |
| 2005/0086297 A1 | 4/2005 | Hinks | |
| 2005/0138193 A1* | 6/2005 | Encarnacion | H04L 12/2803 |
| | | | 709/230 |
| 2007/0016949 A1 | 1/2007 | Dunagan et al. | |
| 2007/0136579 A1 | 6/2007 | Levy et al. | |
| 2007/0162456 A1 | 7/2007 | Agassi et al. | |
| 2007/0174813 A1 | 7/2007 | Snover et al. | |
| 2008/0034415 A1 | 2/2008 | Chacko et al. | |
| 2008/0072311 A1 | 3/2008 | Mullick et al. | |
| 2008/0301701 A1 | 12/2008 | Khijniak et al. | |
| 2009/0031006 A1 | 1/2009 | Johnson | |
| 2009/0138937 A1* | 5/2009 | Erlingsson | H04L 63/1416 |
| | | | 726/1 |
| 2009/0300596 A1 | 12/2009 | Tyhurst et al. | |
| 2010/0058220 A1 | 3/2010 | Carpenter | |
| 2010/0131584 A1 | 5/2010 | Johnson | |
| 2010/0250497 A1 | 9/2010 | Redlich et al. | |
| 2011/0035486 A1 | 2/2011 | Seolas et al. | |
| 2011/0055912 A1 | 3/2011 | Fusari et al. | |
| 2011/0167156 A1 | 7/2011 | Mani et al. | |
| 2011/0214182 A1 | 9/2011 | Adams et al. | |
| 2011/0239270 A1 | 9/2011 | Sovio et al. | |
| 2011/0283363 A1 | 11/2011 | Verschoor et al. | |
| 2012/0016983 A1 | 1/2012 | Ruiz et al. | |
| 2012/0041752 A1 | 2/2012 | Wang et al. | |
| 2012/0089570 A1 | 4/2012 | Zha et al. | |
| 2012/0117644 A1 | 5/2012 | Soeder | |
| 2012/0131473 A1 | 5/2012 | Biron, III | |
| 2012/0173725 A1* | 7/2012 | Verma | G06F 9/5027 |
| | | | 709/225 |
| 2012/0216280 A1* | 8/2012 | Zorn | G06N 7/005 |
| | | | 726/23 |
| 2013/0086676 A1 | 4/2013 | Chess et al. | |
| 2013/0191323 A1 | 7/2013 | Raichelgauz et al. | |
| 2013/0253929 A1 | 9/2013 | Weider et al. | |
| 2013/0291060 A1* | 10/2013 | Moore | G06F 21/6245 |
| | | | 726/1 |
| 2014/0053143 A1 | 2/2014 | Conrod et al. | |
| 2014/0075555 A1 | 3/2014 | Shilimkar | |
| 2014/0208401 A1 | 7/2014 | Balakrishnan et al. | |
| 2014/0297725 A1 | 10/2014 | Biron, III | |
| 2016/0234338 A1 | 8/2016 | Biron, III | |
| 2019/0158508 A1* | 5/2019 | Meredith | H04L 63/107 |

OTHER PUBLICATIONS

Title: Subspace: secure cross-domain communication for web mashups, author: C Jackson et al, published on 2007.*

Cho et al., JWS: A Flexible Web Service, Department of Computer Science, University of Auckland, Jan. 25, 2008, XP002680608, Retrieved from the Internet: URL: http://129.96.12.107/confpapers/CRPITV 74Cho.pdf[retrieved on Jul. 23, 2012] the whole document.

International Preliminary Report on Patentability issued in correspondence PCT Application No. PCT/US2010/057874 dated Jun. 6, 2013 (7 pages).

International Search Report and Written Opinion dated Aug. 2, 2012 in international application No. PCT/US2010/057874 (10 pages).

* cited by examiner

SCRIPTING WEB SERVICES

CROSS-REFERENCE TO RELATED APPLICATIONS

This patent application is a continuation of, and claims priority to, U.S. application Ser. No. 14/921,182 (now, U.S. Pat. No. 9,712,644) filed Oct. 23, 2015; U.S. application Ser. No. 14/921,182 being a continuation of U.S. application Ser. No. 14/170,082 (now, U.S. Pat. No. 9,172,745) filed Jan. 31, 2014; and U.S. application Ser. No. 14/170,082 being a continuation of U.S. application Ser. No. 12/952,890 (now, U.S. Pat. No. 8,689,181) filed Nov. 23, 2010. The contents of U.S. application Ser. Nos. 14/921,182, 14/170,082, and 12/952,890 are incorporated by reference into this patent application as if set forth herein in full.

TECHNICAL FIELD

This patent application relates generally to scripting Web services.

BACKGROUND

The World Wide Web Consortium (W3C) defines a Web service as "a software system designed to support interoperable machine-to-machine interaction over a network. It has an interface described in a machine-processable format (specifically Web Services Description Language WSDL). Other systems interact with the Web Service in a manner prescribed by its description using SOAP messages, typically conveyed using HTTP with an XML serialization in conjunction with other Web-related standards." Many Web services today are now REST-compliant. In REST-compliant Web services, the services manipulate XML representations of Web resources using a uniform set of stateless operations. As is generally known, SOAP is the acronym for Simple Object Access Protocol; HTTP is the acronym for HyperText Transfer Protocol; XML is the acronym for eXtensible Markup Language; and REST is the acronym for Representational State Transfer.

Web services include application programming interfaces (API) or Web APIs that are accessible via HTTP and that are executed on a server hosting the services. A Web service may receive an HTTP request at a server, and send a reply that can be consumed by a computer program rather than a person. The HTTP request may include a Uniform Resource Indicator (URI) that identifies the Web service operation and may include Uniform Resource Locator (URL) parameters. In its reply, the Web service returns data in a format that the requesting client can use. This format is typically XML, or JAVAScript Object Notation (JSON), but can be comma-separated variables, or other formats.

Web services may be statically defined. That is, a Web service may be programmed to receive one or more arguments, to perform a function using those arguments, and to provide a reply. By way of example, a Web service can be called, over the Internet, by a computer program running on a remote device. The computer program can call the Web service to request the weather, for example. The computer program may pass, as arguments to the Web service, a location and a time period. The Web service receives these arguments, obtains the weather for that location and time period, e.g., from a local or remote network resource, and returns the weather at the location for the time period.

Each service that exposes Web services faces the challenge of defining a set of services that are easy enough to use, and powerful enough to solve real problems. Some more complex applications expose Web services that are not statically-defined. Those applications use query languages similar to Structured Query Language (SQL) to query for data. An example of this is Facebook® Query Language (FQL). Languages such as these allow Web services to query database tables in ways that may be more flexible than the more classic scenario described above. Although the languages provide flexibility in using Web services, the Web services themselves remain unchanged.

SUMMARY

This patent application describes methods and apparatus, including computer program products, for scripting Web services. By virtue of the scripting technology described herein, a user can customize Web services to perform any appropriate functions. Thus, instead of creating and loading all Web services when a server is configured for a user, the techniques described herein allow a user, at will, to upload their own scripts to the server to define Web services on the server. The Web services are therefore customized for the user. The same processes may be used for Web services on a server that is accessible to multiple users.

Accordingly, described herein is a method performed on a server, which comprises receiving, from a client, a call to a Web service run on the server, where the Web service corresponds to a script that was uploaded to the server by the client to define the Web service. The method also comprises authenticating the call to an account, identifying a script corresponding to the Web service, executing code corresponding to the script, which code produces an output, and sending the output to the client.

The code may comprise a compiled version of the script. The script may comprise JAVA or Groovy. The script may have a security context. The security context may comprise a JAVA classloader that restricts the script to using an approved set of classes and interfaces. The security context may be modifiable. Authenticating the call may comprise authenticating a user who owns or otherwise controls the account.

Also, described herein is a method performed on a server that comprises configuring the server to enable script for a Web service to be defined dynamically. The Web service includes an application program interface (API) for enabling access by, and interaction with, a computer program executing on a device other than the server. The method also comprises compiling the script to produce machine-executable code for the Web service, receiving a call from the computer program to the Web service, executing the machine-executable code in response to the call to produce an output, and sending the output to the device.

Configuring the server to enable script for the Web service to be defined dynamically may comprise storing, in the server, code to generate a graphical user interface (GUI) into which the script is entered. The method may further comprise receiving a request for the GUI, outputting the GUI in response to the request, and receiving the script via the GUI.

Configuring the server to enable script for the Web service to be defined dynamically may comprise storing, in the server, a compiler for compiling the script, and storing, in the server, a database to store information corresponding to the machine-executable code. Configuring the server may also comprise storing, in the server, machine-executable code that, when executed, enables receipt of the script.

The call to the Web service may comprise a HyperText Transfer Protocol (HTTP) command. The HTTP command may identify the script in accordance with a convention defined by a proprietor of the script. The device designated by the script may be an entity other than the entity on which the computer program runs. The computer program may pass an argument with the call. The argument may be associated with an aspect of an entity being monitored. The machine-executable code for the Web service may obtain information associated with the argument and uses the information to generate the output.

The device may communicate with the server over communication path that is at least partially wireless. The call may comprise instructions to access a functionality of the Web service.

Any two or more of the features described in this patent application, including those described in this summary section, may be combined to form embodiments not specifically described in this patent application.

All or part of the foregoing may be implemented as a computer program product comprised of instructions that are stored on one or more non-transitory machine-readable storage media, and that are executable on one or more processing devices. All or part of the foregoing may be implemented as an apparatus, method, or system that may include one or more processing devices and memory to store executable instructions to implement functionality.

The details of one or more examples are set forth in the accompanying drawings and the description below. Further features, aspects, and advantages will become apparent from the description, the drawings, and the claims.

DESCRIPTION OF THE DRAWINGS

Like reference numerals indicate like elements.

DETAILED DESCRIPTION

This patent application describes processes for scripting Web services. An example process includes configuring a server to enable script for a Web service to be defined dynamically. The Web service includes an application program interface (API) for enabling access by, and interaction with, a computer program executing on a device other than the server. The script is compiled to produce machine-executable code (or simply "code") for the Web service. The resulting code is stored in association with an account. The process also includes receiving, from a client, a call to the Web service, authenticating the call to the account, identifying a script that corresponds to the account, executing code that corresponds to the script to produce an output, and sending the output to the requesting client.

Figure 1:
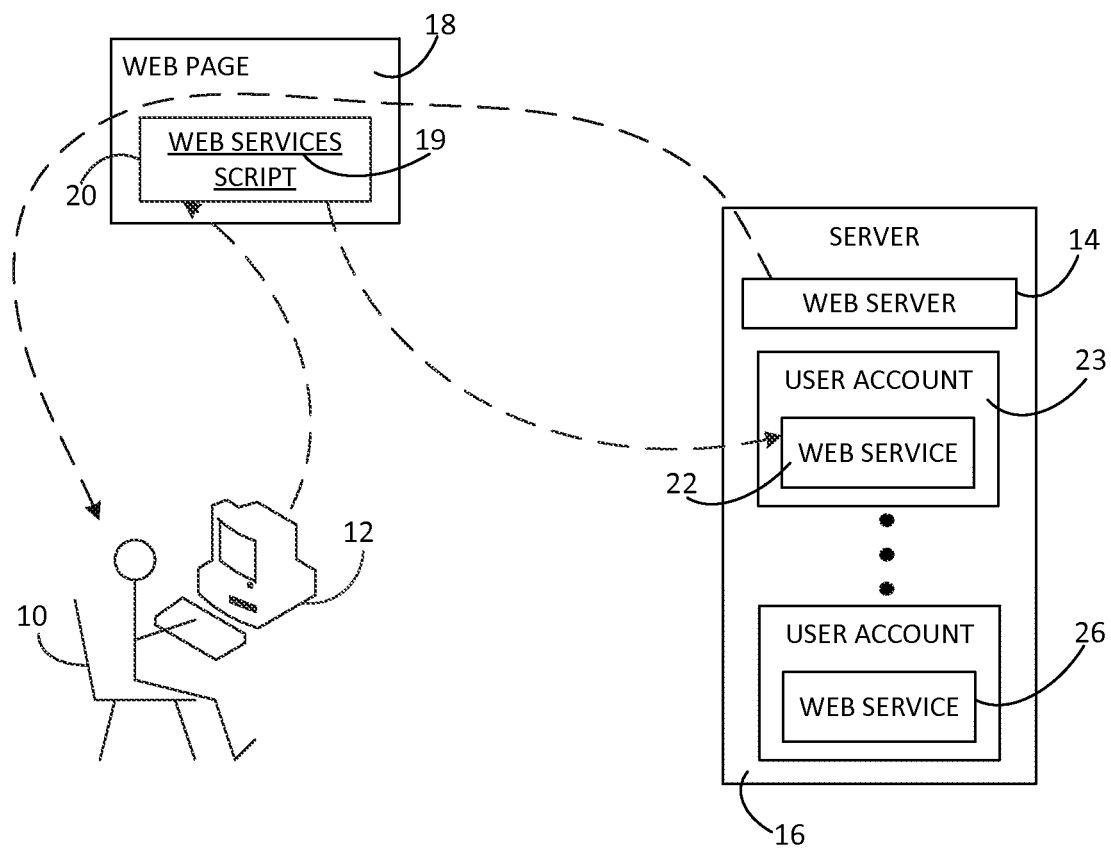
FIG. 1 is a conceptual view of a process for scripting a Web service.
Figure 2:
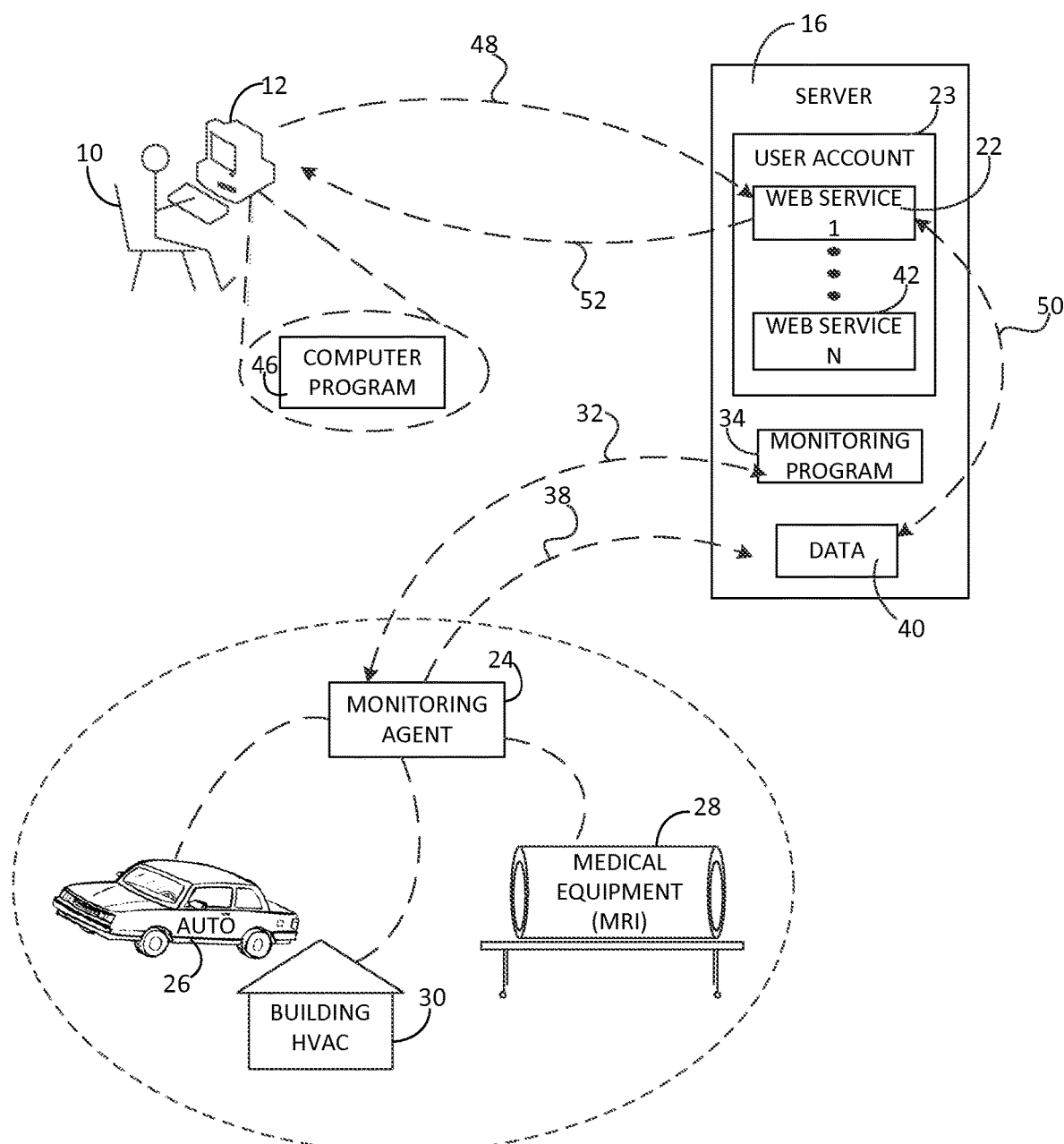
FIG. 2 is a conceptual view of a process for using the scripted Web service.

FIGS. 1 and 2 show an example of the foregoing processes conceptually. As shown in FIG. 1, a user 10 at a client 12 accesses a Web server application 14 running on server 16. Web server application (or simply "Web server") 14 outputs a graphical user interface (GUI), which is typically a Web page 18. Web page 18 allows client 12 to define a Web service dynamically. That is, the Web service may be defined by user 10 to perform whatever functions are programmable. The Web service may be defined using a language, such as JAVA or Groovy. In this example, client 12 Web services enters script 19 into field 20 of Web page 18. This script programs server 16 with Web service 22 functionality that the user would like to implement and make available.

More specifically, the script may be sent to server 16 via Web page 18. Additional information may be sent with, or before, the script. For example, user 10 may log into server 16 before entering script. In this case, server 16 may know the user's account 23 information, e.g., account number, name, etc., and associate that information with a Web service defined by the script. Alternatively, user 10 may enter this information into other fields (not shown) in Web page 18 or in another Web page or form (not shown). The user may also name the Web service using an alphanumeric identifier or other convention.

In the example of FIG. 1, Web services 22 to 26 are associated with corresponding user accounts. At least some of the associated information, such as the name of the Web service and access to the user account, may be required to access the Web services.

Following receipt of script 19, server 16 compiles the script to generate machine-executable code (or simply "code") for implementing the Web service defined by the script.

The code may be stored in a database on server 16 in association with, e.g., account information and/or other identifier(s). The code may be executed on server 16 when Web service 22 is called by a computer program. The code may implement an API, through which other computer programs can access the functionality provided by the Web service. The functionality may include anything that is programmable by the user. For example, the functionality may include calls to other Web services, processing data received from monitoring agents including alarm conditions, selecting a subset of monitored data, accessing tables in a database, processing data from those tables, and so forth.

FIG. 2 shows, conceptually, the operation of a Web service 22 defined according to FIG. 1. In the example of FIG. 2, Web service 22 processes, and reports on, data obtained by a monitoring agent 24. Monitoring agent 24 may include one or more processing devices, such as a microprocessor or a microcontroller. Monitoring agent 24 may be associated with (e.g., embedded in) a system or device that is being monitored. Examples of systems or devices that may be monitored are shown in FIG. 2 and include, but are not limited to, an automobile 26, medical equipment 28 (e.g., a magnetic resonance imaging (MRI) machine), and a building's heating, ventilation, and air conditioning (HVAC) system 30.

In operation, monitoring agent 24 interacts with (32) monitoring program 34, which is running on server 16 in this example, and which itself may be a Web service. Monitoring agent 24 may be configured to report, to monitoring program 34, information about the status and/or operation of the corresponding monitored device and/or system. For example, monitoring agent 24 may report on the number of trips that automobile 26 has taken, with a trip being defined by a start and end of operation, the duration of each trip, and the average speed of each trip. Monitoring agent 24 may also be configured to update itself or its monitored system using information obtained via server 16. For example, monitoring agent 24 may obtain updated parameters for HVAC system 30, such as updated temperature or humidity levels to set and at what times those levels should be set. In another example, monitoring agent 24 may obtain software updates and upgrade the software (e.g., operating system) of its monitored device and/or system using the software updates.

In this example, as a result of the interaction (32) between monitoring agent 24 and monitoring program 34, monitoring agent 24 provides (38) data 40 about the operation and/or status of monitored devices/systems. This data may be stored in server 16, as shown.

In this example, Web services 22 to 42 are associated with user account 23. To access Web service 22, a user 10 at client 12 accesses user account 23. This may be done by logging into the account via a Web page or other GUI. Alternatively, a computer program 46 on client 12 calling Web service 22 may log into the user's account without interaction from the user. If there is more than one Web service associated with the user account, as is the case in this example, it may be necessary to identify the Web service that is to be accessed. This may be done via computer program 46. For example, if computer program 46 is designed to obtain information about the operation of automobile 26, computer program 46 will identify Web service 22. This may be done, e.g., by making a call (48) to that Web service and by including a Web service name or other identifier in the call.

Computer program 46 may pass to Web service 22 one or more arguments, such as an identifier for automobile 26 (particularly if, e.g., Web service 22 is configured to work with more than one automobile). In response, Web service 22 may retrieve (50) data 40 that has been obtained by monitoring the operation and/or status of automobile 26. This data may be filtered or otherwise processed for presentation to computer program 46. For example, the data may include starting and ending times for a trip, and the length of the trip. Web service 22 may use this information to calculate the average speed over the course of the trip, and return only this average speed. Web service 22 provides (52) its information to computer program 46. This information is then displayed or otherwise presented to user 10.

Should user 10 require different or additional information, user 10 can create a new Web service or edit an existing Web service. This may be done in accordance with the process shown conceptually in FIG. 1.

Figure 3:
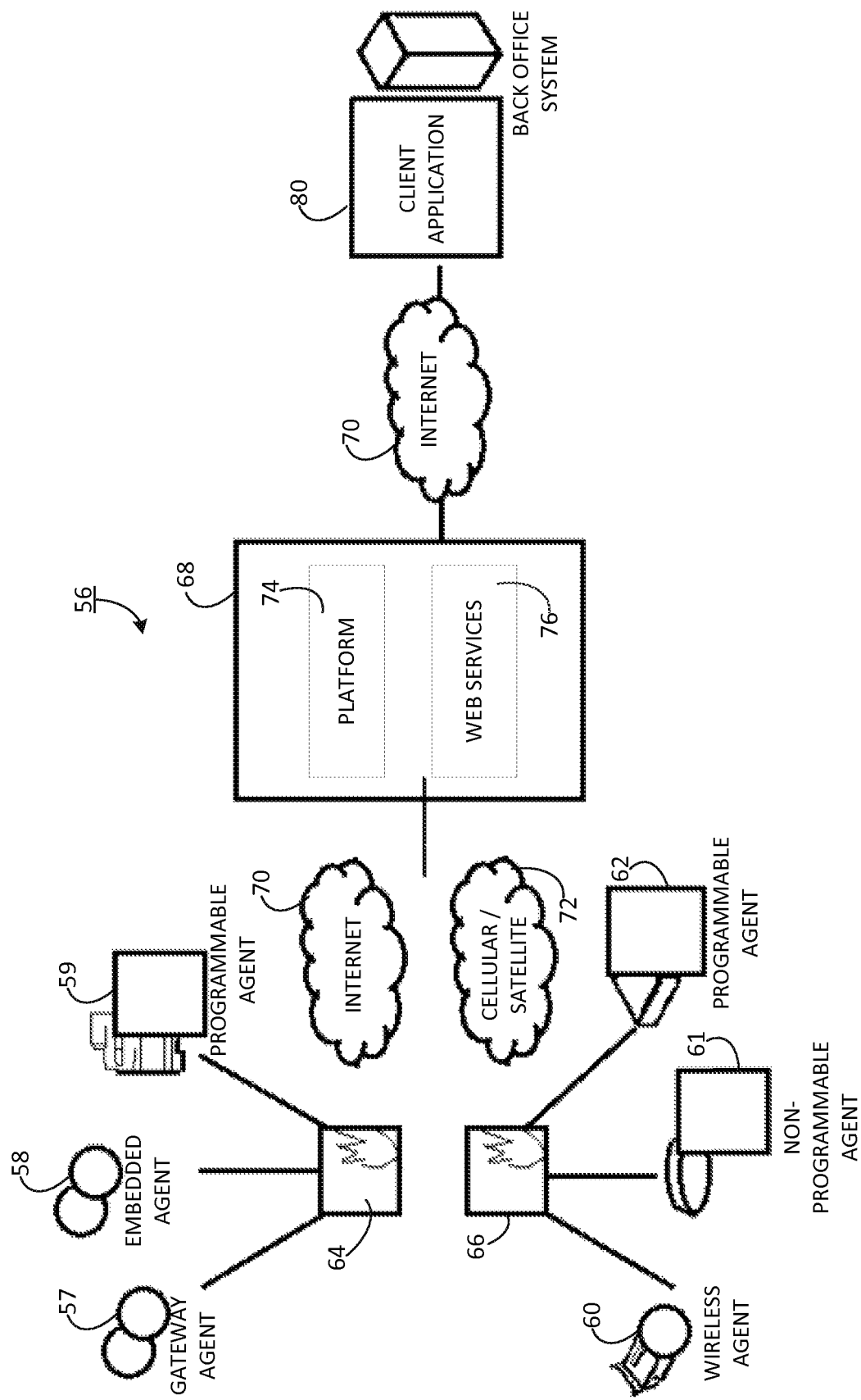
FIG. 3 shows a conceptual view of a network on which the processes of FIGS. 1 and 2 may be implemented.

FIG. 3 shows, conceptually, an example of a system 56 on which the processes shown in FIGS. 1 and 2 may be implemented. As shown in FIG. 3, one or more agents (e.g., devices and/or computer programs) 57 to 62 may be used to monitor the operation and/or status of systems 64 and 66. These monitoring agents may include embedded agents, gateway agents, custom agents (e.g., programmable devices), non-programmable agents, and/or wireless protocol agents. Monitoring agents 57 to 62 communicate with server 68 via a network, such as the Internet 70 and/or a cellular network 72. Server 68 runs a platform 74, which may include an operating system and other functionality to support communication with the monitoring agents. Server 68 also supports Web services 76, including Web services that have been defined according to the process of FIG. 1.

Server 68 may be a central server that is accessible to different clients at different companies, or server 68 may be company-specific, meaning that it is accessible by, and contains Web services for, only a particular company. A client 80 accesses Web services 76 via a network 70, such as the Internet. Client 80 may include, but is not limited to, a back-office system, such as a customer relationship management (CRM) system, a product lifecycle management (PLM) system, and/or a supply chain management (SCM) system.

By way of example, consider an SCM application that monitors goods moved between a supplier and a customer. If the SCM application tracks returned goods and determines, through its own analysis, that one process seems to be generating a large number of returned products, the ability to diagnose and fix the process would be beneficial. Using a dynamically-defined Web service of the type described herein, the SCM application could query a database maintained by platform 74 to locate equipment and systems included in the monitored process. Using Web services 76, platform 74 may analyze the data and flag, to the SCM application, the trouble areas in the process. In addition, platform 74 could notify and provide technicians with a history of the troubled equipment. In this example, all communications and data transmissions between the SCM system and the platform may be secure.

Figure 4:
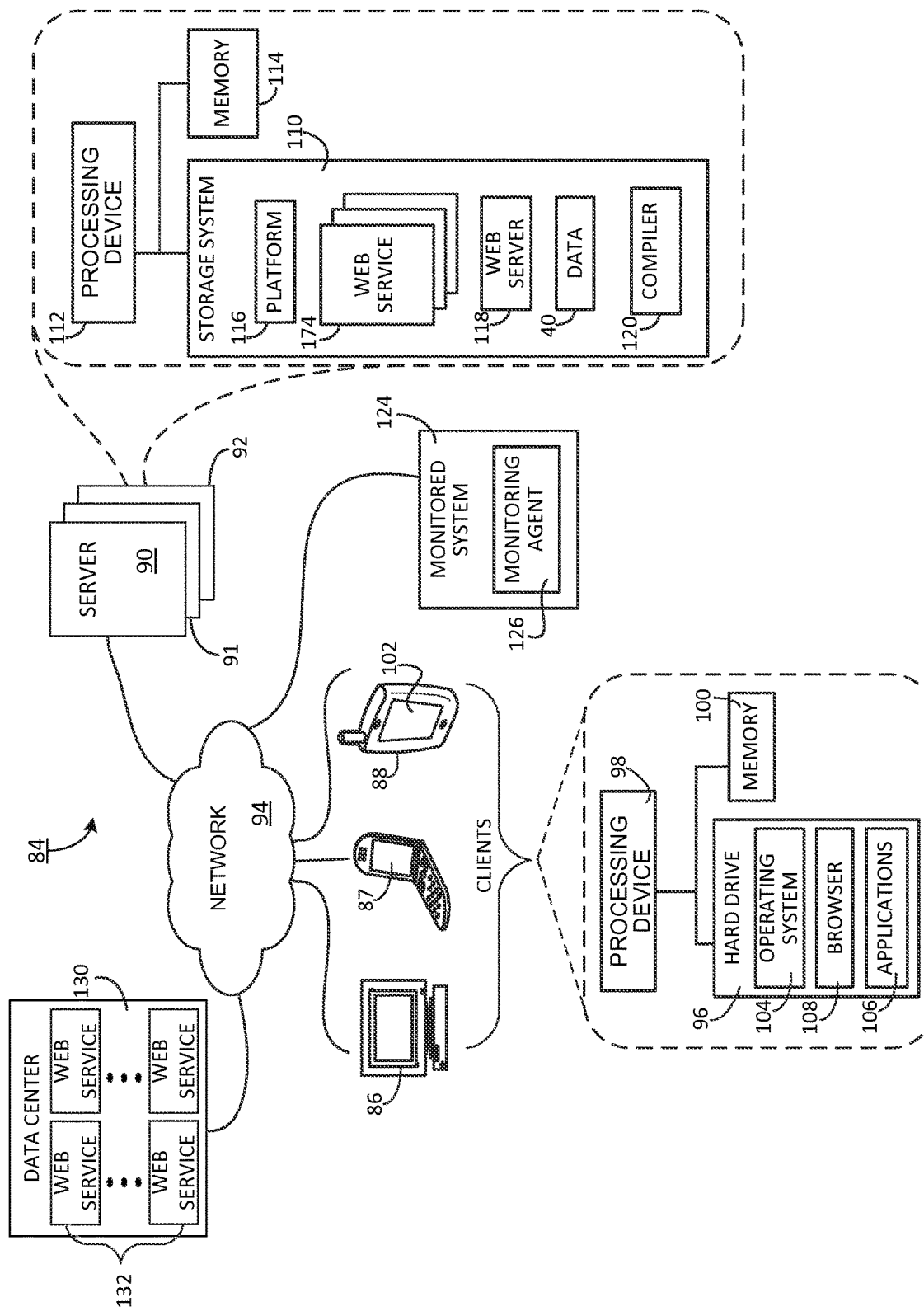
FIG. 4 shows a network on which the processes of FIGS. 1 and 2 may be implemented.

FIG. 4 shows a more detailed example of a network system 84 on which the processes shown conceptually in FIGS. 1 and 2 may be implemented. It is noted that the network systems shown in FIGS. 3 and 4 are presented merely for illustration. The techniques described herein are not limited to use on a network system having the architectural configuration of FIG. 3 or 4. Rather, the processes depicted in FIGS. 1 and 2 can be implemented using any appropriate network, hardware, and/or software architectures.

Network system 84 includes clients 86 to 88 and servers 90 to 92. These clients and servers are connected via network 94. Network 94 may include one or more networks, such as a local area network (LAN), a wide area network (WAN), and/or the Internet. One or more of the networks that make up network 94 may be wireless, such as a cellular telephone network or a Wi-Fi network. Network 94, in conjunction with one or more of the clients and servers, may form a cloud computing system.

Each client may be a computing device, such as desktop, a laptop, a tablet, a smartphone, or the like. Generally, a smartphone is a mobile device that offers advanced computing capabilities, such as the ability to execute applications and to communicate with a server or another appropriate computing device.

Each client, may include a hard drive 96 for storing data and computer programs, and one or more processing devices 98 (e.g., a microprocessor) and memory 100 (e.g., RAM) for executing computer programs. A display screen (e.g., 102), such as an LCD (Liquid Crystal Display) or a CRT (Cathode Ray Tube) displays, to a user, images that are generated by the client including, but not limited to, the Web pages and outputs described herein. As is well known, display on a computer peripheral (e.g., a monitor) physically transforms the computer peripheral. For example, if the computer peripheral is LCD-based, the orientation of liquid crystals can be changed by the application of biasing voltages in a physical transformation that is visually apparent to the user. As another example, if the computer peripheral is a CRT, the state of a fluorescent screen can be changed by the impact of electrons in a physical transformation that is also visually apparent. Each display screen may be touch-sensitive, allowing a user to enter information onto the display screen via a virtual keyboard. On some clients, such as a desktop or smartphone, a physical QWERTY keyboard and scroll wheel may be provided for entering information onto the display screen.

Each client may run an operating system (OS) 104, such as a version of MICROSOFT WINDOWS or MAC OSX. Computer programs, including applications 106, are stored, e.g., in hard drive 96, and execute on top of the OS. Among these computer programs may a Web Browser 108, such as MICROSOFT INTERNET EXPLORER, GOOGLE CHROME, or APPLE SAFARI for accessing data from the servers. This data may include Web pages for entering script and other information to generate Web services, and information provided by those Web services, including graphics and alphanumerics.

Each of servers 90 to 92 may have the same, or similar, hardware and/or software configuration. In a case where all of the servers are owned by the same entity, servers 90 to 92 may act together to perform the functions described herein. In the case of multiple servers, server 90 may act as a controller or "load balancer" for the remaining servers 91 and 92. In this role, server 90 may route data, requests, and instructions between a client and a "slave" server, such as server 92. Server 90 may store information locally, then route data to another server, such as server 92. For the purposes of the following, such internal communications between server 90 and slave servers will be assumed. In a case where the servers are owned by different entities, a single server may perform all of the server functions.

Since all of the servers may have the same, or similar, architecture only the architecture of server 90 is described. Server 90 may be identical in structure and function to server 16 of FIGS. 1 and 2. Server 90 includes a storage system 110, e.g., RAID (Redundant Array of Inexpensive Disks), for storing data and computer programs, and one or more processing device(s) 112 (e.g., one or more microprocessors) and memory 114 (e.g., RAM) for executing computer programs. Each server may run a platform 116, which includes an operating system such as a version of LINUX, and one or more computer programs for interacting with the server's clients. Computer programs, including a Web server 118 and a compiler 120, may be stored, e.g., in storage system 110, and execute on top of the platform to perform the functions described herein. Storage system 110 may also include a database for storing Web services 174. Web services 174 may correspond to Web services 22 of FIGS. 1 and 2. Data for each Web service may include, for example, script that defines the Web service, machine-executable code that is generated by compiling the script, and information associated with the Web service, e.g., to identify the Web service or corresponding account.

Each server may host, or otherwise provide access to, information contained therein. For example, a user at a client 86 may sign onto a Web site hosted by server 90 (or, e.g., for which server 90 is gateway). In response, e.g., through an appropriate HTTP exchange, server 90 may provide, to client 86, the Web page (or other GUI) (e.g., Web page 18 of FIG. 1) for entering script to define a Web service, as described in more detail below.

Monitored system 124 may be any type of device and/or system that can be monitored, examples of which include, but are not limited to, the examples shown in FIG. 2. Monitoring agent 126 may be a computer program or a device, such as a microprocessor or microcontroller, that is configured to operate in conjunction with a system to monitor and/or control its status and/or operation. Monitoring agent 126 may correspond to monitoring agent 24 of FIG. 2.

Monitoring agent 126 may be configured to communicate with server 90 over network 94. For example, monitoring agent 126 may be a wireless device that is configured to communicate over network 94 using one or more wireless protocols. Alternatively, monitoring agent may be a wired device. For example, monitoring agent 126 may be behind a firewall, may be a device of the type described in one or more of the following, and may be configured to communicate with server 90 via one or more of the techniques described in one or more of the following: U.S. Pat. Nos. 7,117,239, 7,185,014, U.S. patent application Ser. Nos. 10/124,181, and 11/537,399. The contents of U.S. Pat. Nos. 7,117,239, 7,185,014, U.S. patent application Ser. Nos. 10/124,181, and 11/537,399 are hereby incorporated by reference into this application as if set forth herein in full. In this regard, any appropriate features described in U.S. Pat. Nos. 7,117,239, 7,185,014, U.S. patent application Ser. Nos. 10/124,181, and 11/537,399 may be used in conjunction with the techniques described herein.

Data center 130 may be a repository for Web services 132. In this example, data center 130 and server 90 are separate entities; however, in other examples, the two may be combined in a single device or set of devices. Data center 130 may include a storage system (not shown) for storing code and other information for Web services 132, and one or more processing devices (not show) for making the Web services accessible to clients of the data center over network 94. For example, data center 130 may include a library of Web services that are available to clients over network 94. A client may access such a Web service directly from the data center, or it may take code therefor and store that code on its own server(s). Likewise, a client may access script that defines those Web services and modify the script to generate new Web services. The resulting new Web services may be stored either in the client's server(s) or in the data repository library. The library of scripts stored in the data center (or server 16 or 90 to 92) can be versioned, meaning that they can exist in different versions with appropriate version identifiers associated therewith. A client may therefore use, or roll back to, to a previous version of a script (e.g., if undesirable edits were made to a Web services script).

Figure 5:
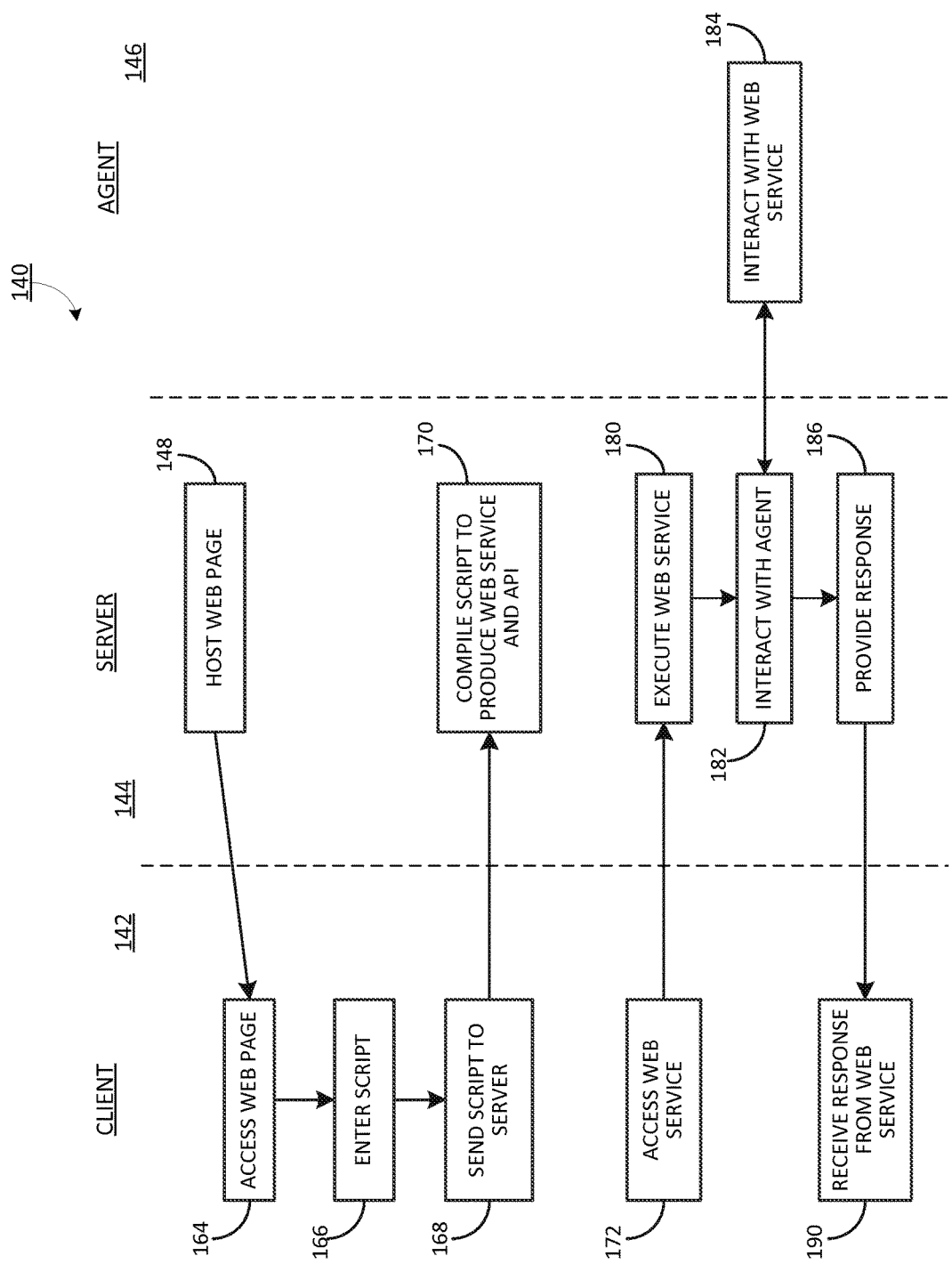
FIG. 5 is a flowchart showing the processes of FIGS. 1 and 2.

FIG. 5 shows an example of a process 140 for scripting Web services using the techniques described herein. Process 140 includes a part 142 that may be performed by a client (e.g., client 86), a part 144 that may be performed by a server (e.g., server 90), and a part 146 that may be performed by a monitoring agent (e.g., agent 126). In this regard, the process shown in FIG. 5 is presented merely for illustration. The techniques described herein for scripting Web services are not limited to the process sequence shown of FIG. 5. Rather, the actions shown in FIG. 5 may be performed in a different sequence by different entities; actions may be added to the sequence; actions may be omitted from the sequence; and/or actions in the sequence may be consolidated.

Figure 6:
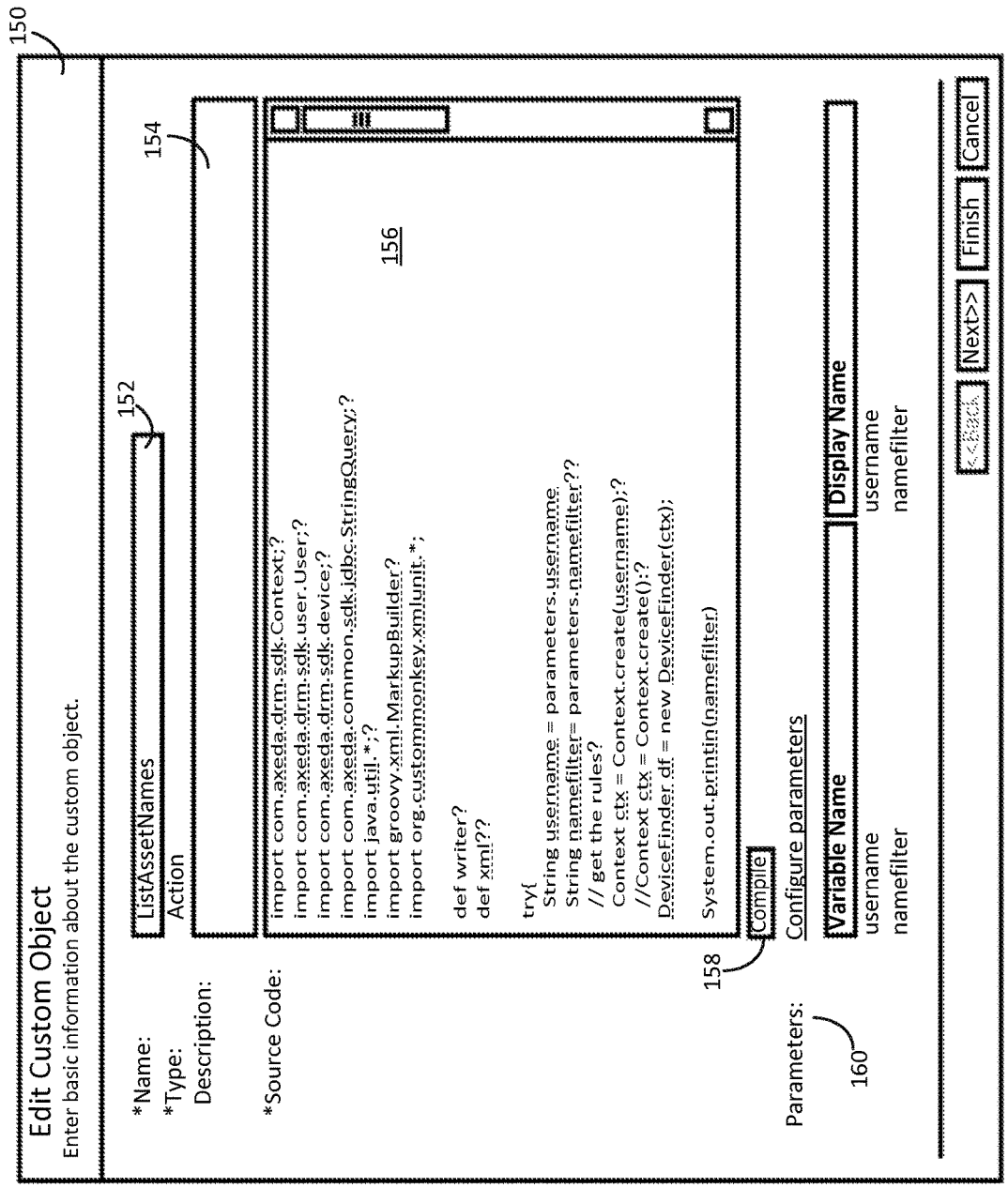
FIG. 6 shows an example of a user interface for entering script for a Web service.

As part of process 140, server 90 is configured to enable script for a Web service to be defined dynamically. This may be done by storing, in server 90, code to generate a Web page (or other GUI), such as Web page 18 of FIG. 1, into which script that defines the Web service is to be entered. Server 90 hosts (148) this Web page, thereby enabling clients to access it over a network. An implementation of this Web page is shown in FIG. 6. Specifically, FIG. 6 shows a Web page 150 that includes a field 152 for defining a name of a Web service, a field 154 for providing a description of the Web service (e.g., it's functionality), and a field 156 for entering script (source code) for implementing the Web service. Web page 150 also includes a control 158 that triggers compilation of the script. Web page 150 also includes controls 160 to define parameters in the source code, e.g., "username" and "name filter".

The script may define a context in which it should run. In this example, there are two types of contexts: user and system. Under the user context, the script runs with the permissions or privileges defined for a specified user. Under the system context, the script runs with privileges and permissions for access to all functionality and database objects (like an administrator). For example, if the script needs to perform administrative-type functionality, like determining device group assignments for users or defining data item groups, the script should run under a system context. The context passed by the Web service does not need to be the same context defined for the script. For example, if a Web service is run in a user context, and the script defines a system context, the Web service will handle switching the context back to user context after the script finishes running.

In an implementation, the script has a security context. The security context may be a JAVA classloader that restricts the script to using an approved set of classes and interfaces.

In FIG. 5, client 86 accesses (164) Web page 150 through its browser 108. To access the Web page, a user at client 86 may need to sign into his account on server 90; however, this is not a requirement. Script for the Web service is entered (166) into the Web page. The script may be JAVA or Groovy, for example. Other programming languages may also be entered to define the Web service. Web page 150 may send (168) the uncompiled script to server 90, where it is compiled (170) by compiler 120 and where the resulting machine-executable code is stored for use. Alternatively, the script may be compiled locally and resulting machine-executable code sent to server 90 for storage, with or without the corresponding script. Identifying information for the Web service also may be sent to server 90, and stored in associate with code and/or script for the Web service.

Client 86 may access (172) Web service 174 (FIG. 4). Web service 174 includes a Web API, which allows the Web service to interact with a computer program running on the client. For example, the computer program on client 86 may call the Web service to obtain information therefrom. The call may include one or more arguments that may be used by the Web service to generate its output, or may indicate to the Web service the outputs that are needed. Arguments used for other purposes may also be passed to the Web service.

Code on server 90 may authenticate the call to an account (e.g., the user's account), identify a script (e.g., on server 90) corresponding to the Web service, execute code corresponding to the Web service, and send an output produced by the Web service to the client. In this regard, Web services for the server platform 116 may enable remote users to access and affect information in the platform's database, and to access and perform operations on managed assets. Each Web services call to the platform may specify an authenticated user account. The platform validates the user account provided for an operation against its directory service (LDAP or Active Directory) and user group settings, determining the following: if the user is permitted access to the platform, and if the user has privileges to access the data and perform the operations specified in the Web service call.

If an entity does not have privileges to perform an operation, an "Access Denied" message may be returned to client 86 along with information about which privilege is required. Additionally, queries will not return information for any devices to which a user does not have device permissions.

The platform maintains an audit log of significant user actions that occur in the system, including operations performed, or attempted, through Web services. Examples of audited activity include user logins, operations that affect database information (including creating, deleting, updating database objects, or assigning or unassigning associations), agent and device operations, and remote access sessions. Audit information is shown in an audit log, which is available through an administration application.

In the example of FIG. 4, server 90 executes (180) code corresponding to the called Web service, and interacts (182) with a monitoring agent to obtain information about a system being monitored and/or controlled by that agent. Monitoring agent 126 interacts (184) with the Web service to provide whatever information is requested.

Web service 174 provides (186) its information—in this example, information based on that provided by monitoring agent 126—to the requesting computer program running in client 86. The computer program receives (190) that information at client 86, and uses that information to generate an appropriate output. For example, the computer program may render graphical information on a machine display (e.g., a computer monitor or cell phone display screen) showing the past, present, and projected states of the monitored system. In another example, the computer program may be an application or "app" running on a smartphone, and the monitored system may be an automobile. In this example, a user on the smartphone may track use of the automobile through graphics, tables, text or the like that is displayed on the smartphone's display screen by the app.

In an alternative implementation, script defining a Web service can be uploaded to server 16 or 90 to 91 through another Web service, rather than through a Web page. For example, script may be entered into a computer program or a template on the client. The script may be passed as an argument in a call to a Web service running on the server. The Web service on the server may cause the script to be compiled and the resulting code stored, thereby allowing the resulting new Web service to be accessed at the server. In another example, script for the Web service may be entered into a computer program or interface at the client. A Web service running on the server may query the computer program or interface (e.g., periodically) for new script. If there is new script, the Web service may retrieve that script and cause it to be compiled and the resulting code to be stored on the server, thereby allowing the resulting new Web service to be accessed at the server. The Web service may query the client in accordance with any appropriate processes, such as those described in U.S. Pat. No. 7,185,014, U.S. patent application Ser. Nos. 10/124,181, and 11/537,399 incorporated by reference above.

A particular implementation of Web services scripting is provided below. In this implementation, a server stores a platform for creating applications via the Internet. The interactions can be complex, and may include multiple actions and/or branching logic. The platform supports flexible, customer-programmed Web services. Each customer creates their own set of Web services and uses them in their applications. A customer can also publish the Web services and allow others to create clients that use those Web services.

A server, which may be hosted in a data center, provides an Internet service and publishes Web services in addition to a Web user interface (UI). Customers login to the UI and define their Web services, which are then published to Web service clients.

The UI includes field(s) to enter script that defines a Web service. The script has a unique name, a set of parameters, and programming language code. When the script is saved in the server, its name can be called in the URI of a Web service call. For example, a script like:

```
script name: HelloWorld
parameters: planet
code:
def result = "Hello ${parameters.planet}"
return ['Content-Type':'text/plain', 'Content':result.toString( )]
``` can be called with an HTTP POST to URI, as follows:
http://server.axeda.com/services/v1/rest/Script/HelloWorld
with the POST parameter planet=Pluto, and the response would be "Hello Pluto".

When code for a script is executed, it can call allowed server APIs to query, modify or take actions. For security, each script is executed in a secure environment that restricts what the script code can do. Scripts are thus not able to harm the server or perform unauthorized actions. When a client calls a Web service, user credentials may be required. User permissions are applied to APIs that the script can call, thereby limiting the script to safe actions based on the permissions given to that user by an administrator.

In this regard, each call to a Web service may identify an authenticated platform user. To do this, the computer program making the call must first login to the platform via an authentication service login operation. If a username and password for an authenticated user are provided to the login operation, it will return a SessionId token. That token is cached and then passed with each subsequent Web service operation. If an invalid SessionId is passed to an operation, or the SessionId that was passed has timed out, the platform will ignore the operation request. The user account passed to the login operation should authenticate to an existing user with sufficient privileges. Each Web service may be limited to the actions and objects to which the user has privileges. For example, calling "getDevices" will return only the devices that this user is allowed to see if he or she logs into the platform. A client should use a login that has appropriate privileges for its intended task.

The process of creating a script may include a user logging into the server platform via a UI. The user submits a script as above. The script code is then compiled and may be tested. Generally speaking, scripts need to be managed in development and production. A script may be uploaded to the server for testing. When the testing is successful, that script may be promoted to production. If there are any errors in the compilation or testing of the script, an error message is displayed and the user must correct the script. If there are no errors, the resulting compiled code is stored so that it can be executed relatively quickly. This code may be JAVA bytecodes or .NET CLR, or it may be that the script is interpreted when it runs, as is the case with perl code.

In an example, a client computer program calls a Web service that returns the status of some equipment. The client creates a request to a URI, such as:
http://server.axeda.com/services/v1/rest/Script/GetStatus?user=ted&password=Ty!de88
The server handles the request by extracting the script name ("GetStatus") and user credentials. The user credentials are authenticated, and if the authentication process fails, an error is returned. For example, if the script name does not reference a legal script in the server, or this user does not have permissions to run this script, an error is returned to the client. Otherwise the named script is loaded into a secure "sandbox" environment and run. In JAVA, this is done via a custom classloader that has a predefined set of JAVA classes that are included in its path. References to classes outside the path are not allowed. Parameters in the URL or the HTTP POST body are passed into the script as named parameters.

The script is allowed to call the server's API, and certain external methods. For example, a script can call another server's web services. The APIs in the server may be related to monitored assets (e.g., devices, systems, etc.). A script may query the values of readings associated with those assets and also check if the asset has any recent alarm conditions. The result of running the script is a returned HTTP content-type and content.

All or part of the processes described herein and their various modifications (hereinafter referred to as "the processes") can be implemented, at least in part, via a computer program product, i.e., a computer program tangibly embodied in one or more information carriers, e.g., in one or more tangible, non-transitory machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Elements of different implementations described herein may be combined to form other implementations not specifically set forth above. Other implementations not specifically described herein are also within the scope of the following claims.

What is claimed is:

1. A computing system on a computer network, comprising:
   memory storing instructions that are executable; and
   one or more processing devices to execute the instructions to perform operations comprising:
      receiving scripts for Web services from clients of the computing system, each Web service comprising a custom Web service for each user at a respective client;
      providing, to one of the clients, a session identifier token, the session identifier token indicating that a user at the one of the clients is authenticated for a Web service of the Web services, the session identifier token being time-limited;
      receiving, from the one of the clients, a call to the Web service, the call to the Web service comprising the session identifier token; and
      executing the Web service in response to the call, the Web service being restricted in operation based on privileges of the user, the Web service being configured to access at least some assets based on the privileges, and the Web service being configured to provide, to the one of the clients, the session identifier token and information about the at least some assets;
      wherein the Web service comprises script to switch between different contexts of operation while the Web service is run, where the different contexts define different privileges available to the Web service.

2. The computing system of claim 1, wherein the operations comprise outputting data representing a Web page to the clients; and
   wherein the scripts are received from the clients via instances of the Web page.

3. The computing system of claim 2, wherein the Web page comprises a control for triggering compilation of the scripts; and
   wherein the operations comprise compiling a script for the Web service in response to data received following triggering of the control on an instance of the Web page.

4. The computing system of claim 1, wherein the information about the at least some of the assets comprises monitored information relating to an operational status of the at least some assets.

5. The computing system of claim 1, wherein an asset among the at least some assets is associated with a monitoring device configured to perform monitoring and control functions; and
   wherein the operations comprise outputting, to the monitoring device, data representing one or more updated parameters for the asset.

6. The computing system of claim 1, wherein an asset among the at least some assets is associated with a monitoring device configured to perform monitoring and control functions; and
   wherein the operations comprise outputting, to the monitoring device, data for upgrading software on the monitoring device.

7. The computing system of claim 1, wherein an asset among the at least some assets is associated with a monitoring device configured to perform monitoring and control functions; and
   wherein the operations comprise outputting, to the monitoring device, data for upgrading software on the asset.

8. The computing system of claim 1, further comprising:
   a database storing executable code for each of the Web services, the database storing executable code for different versions of at least some of the Web services, a version of the Web service being specified in the call.

9. The computing system of claim 1, wherein the Web service is executed in a secure environment on the computing system, the secure environment restricting operations of the Web service.

10. The computing system of claim 1, wherein script for one or more of the Web services is received by a second Web service outputting a query for the script.

11. Non-transitory machine-readable storage storing instructions that are executable on one or more processing devices of a computing system to perform operations comprising:
    receiving scripts for Web services from clients of the computing system, each Web service comprising a custom Web service for each user at a respective client;
    providing, to one of the clients, a session identifier token, the session identifier token indicating that a user at the one of the clients is authenticated for a Web service of the Web services, the session identifier token being time-limited;
    receiving, from the one of the clients, a call to the Web service, the call to the Web service comprising the session identifier token; and
    executing the Web service in response to the call, the Web service being restricted in operation based on privileges of the user, the Web service being configured to access at least some assets based on the privileges, and the Web service being configured to provide, to the one of the clients, the session identifier token and information about the at least some assets;
    wherein the Web service comprises script to switch between different contexts of operation while the Web service is run, where the different contexts define different privileges available to the Web service.

12. The non-transitory machine-readable storage of claim 11, wherein the operations comprise outputting data representing a Web page to the clients; and
    wherein the scripts are received from the clients via instances of the Web page.

13. The non-transitory machine-readable storage of claim 12, wherein the Web page comprises a control for triggering compilation of the scripts; and
    wherein the operations comprise compiling a script for the Web service in response to data received following triggering of the control on an instance of the Web page.

14. The non-transitory machine-readable storage of claim 11, wherein the information about the at least some of the assets comprises monitored information relating to an operational status of the at least some assets.

15. The non-transitory machine-readable storage of claim 11, wherein an asset among the at least some assets is associated with a monitoring device configured to perform monitoring and control functions; and wherein the operations comprise outputting, to the monitoring device, data representing one or more updated parameters for the asset.

16. The non-transitory machine-readable storage of claim 11, wherein an asset among the at least some assets is associated with a monitoring device configured to perform monitoring and control functions; and wherein the operations comprise outputting, to the monitoring device, data for upgrading software on the monitoring device.

17. The non-transitory machine-readable storage of claim 11, wherein an asset among the at least some assets is associated with a monitoring device configured to perform monitoring and control functions; and wherein the operations comprise outputting, to the monitoring device, data for upgrading software on the asset.

18. The non-transitory machine-readable storage of claim 11, wherein the operations comprise:

accessing a database storing executable code for each of the Web services, the database storing executable code for different versions of at least some of the Web services, a version of the Web service being specified in the call.

19. The non-transitory machine-readable storage of claim 11, wherein the Web service is executed in a secure environment on the computing system, the secure environment restricting operations of the Web service.

20. The non-transitory machine-readable storage of claim 11, wherein script for one or more of the Web services is received by a second Web service outputting a query for the script.

21. A method performed by a computing system, comprising:

receiving scripts for Web services from clients of the computing system, each Web service comprising a custom Web service for each user at a respective client;

providing, to one of the clients, a session identifier token, the session identifier token indicating that a user at the one of the clients is authenticated for a Web service of the Web services, the session identifier token being time-limited;

receiving, from the one of the clients, a call to the Web service, the call to the Web service comprising the session identifier token; and executing the Web service in response to the call, the Web service being restricted in operation based on privileges of the user, the Web service being configured to access at least some assets based on the privileges, and the Web service being configured to provide, to the one of the clients, the session identifier token and information about the at least some assets;

wherein the Web service comprises script to switch between different contexts of operation while the Web service is run, where the different contexts define different privileges available to the Web service.

* * * * *